United States Patent [19]
Pires

[11] Patent Number: 5,161,188
[45] Date of Patent: Nov. 3, 1992

[54] SCRAMBLING VIDEO BY HORIZONTAL AND VERTICAL TIME SHIFTING

[76] Inventor: H. George Pires, 47H Valley Rd., Hampton, N.J. 08827

[21] Appl. No.: 732,593

[22] Filed: Jul. 19, 1991

[51] Int. Cl.$^5$ .................................................. H04N 7/167
[52] U.S. Cl. ........................................ 380/15; 380/11; 380/14
[58] Field of Search .............................. 380/11, 14, 15

[56] References Cited

U.S. PATENT DOCUMENTS

| | | | |
|---|---|---|---|
| 4,901,349 | 2/1990 | Metzger et al. | 380/11 |
| 4,916,736 | 4/1990 | Ryan | 380/11 |
| 5,003,592 | 3/1991 | Pires | 380/11 |
| 5,034,981 | 7/1991 | Leonard et al. | 380/15 |
| 5,058,157 | 10/1991 | Ryan | 380/11 |
| 5,060,262 | 10/1991 | Beuins, Jr. et al. | 380/15 |

*Primary Examiner*—Salvatore Cangialosi
*Attorney, Agent, or Firm*—Rohm & Monsanto

[57] ABSTRACT

A system for scrambling and descrambling the image associated with a video signal employs the shifting in time of a video image after removal of vertical and horizontal synchronization, and color burst reference signals. Coded data which contains information necessary for unscrambling the video image is transmitted in the video signal itself during the vertical blanking interval. A high level of simplification in the decoding is achieved by merely restoring synchronization and color reference data without the need for returning the video image to its original timing. This system provides the significant advantage of permitting unscrambling by unlocking vertical and horizontal synchronization of the video image using inexpensive circuitry at the decoder end, while affording the operator of the transmitter the ability to select whether the unscrambled signal is recordable by a conventional video tape recorder at the receiving end.

14 Claims, 7 Drawing Sheets

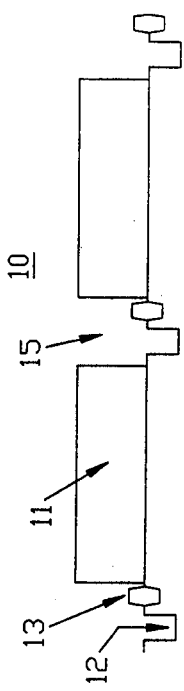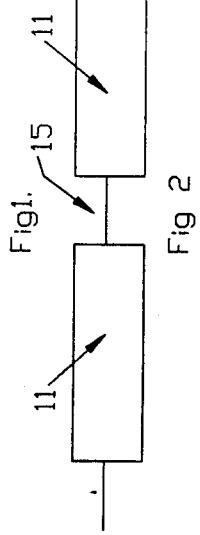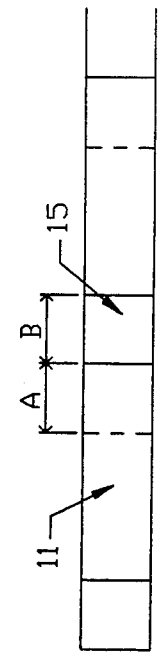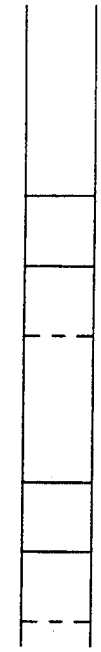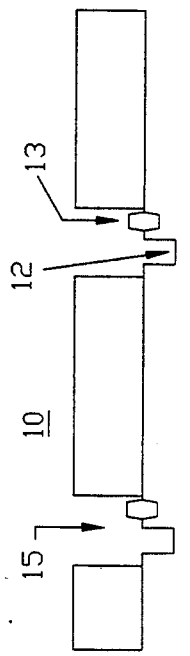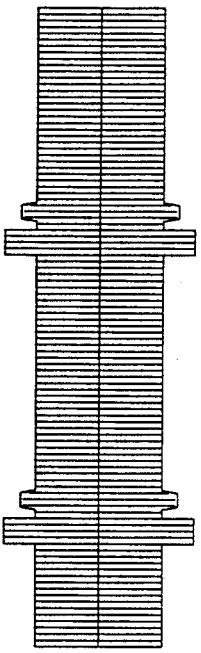

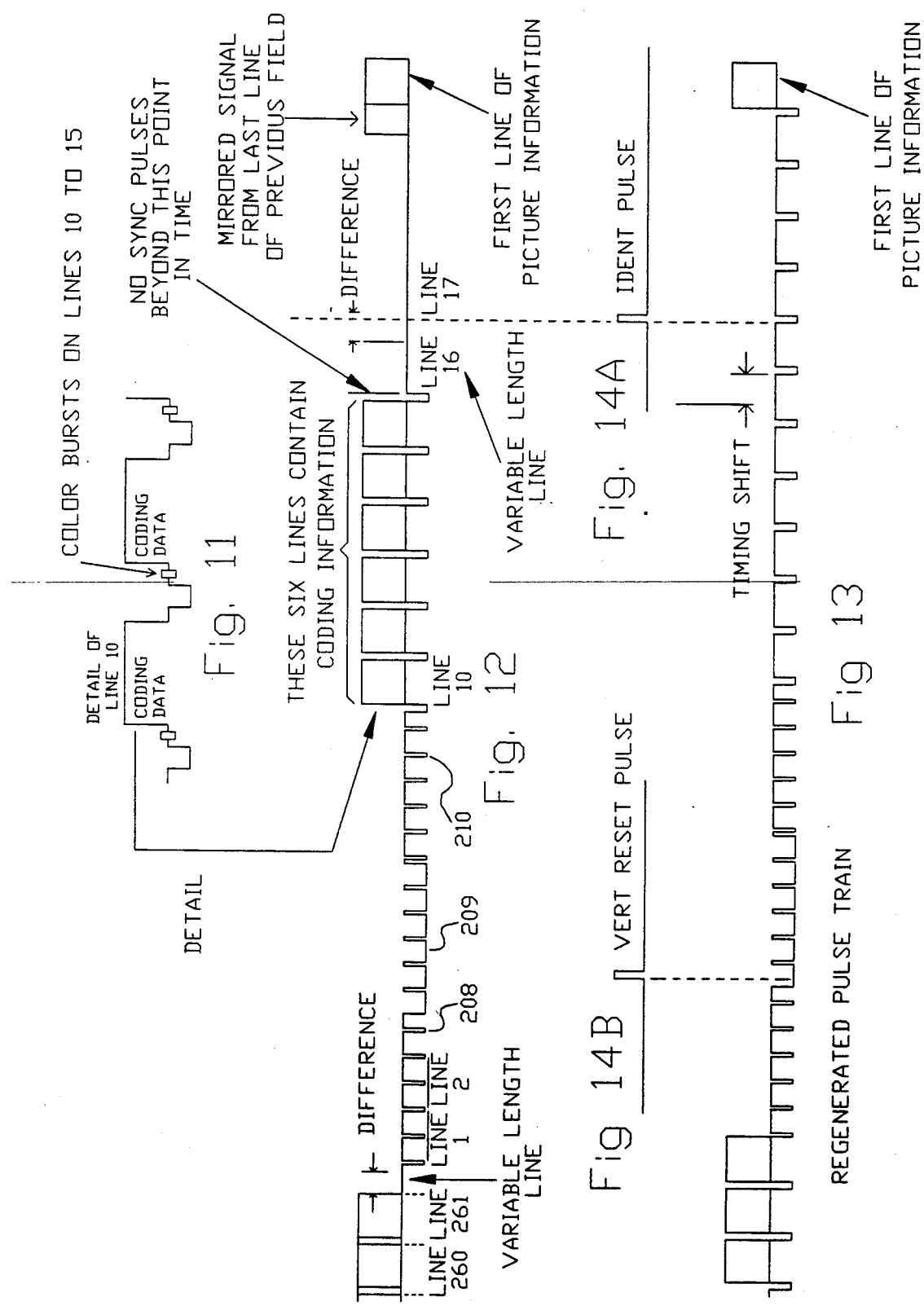

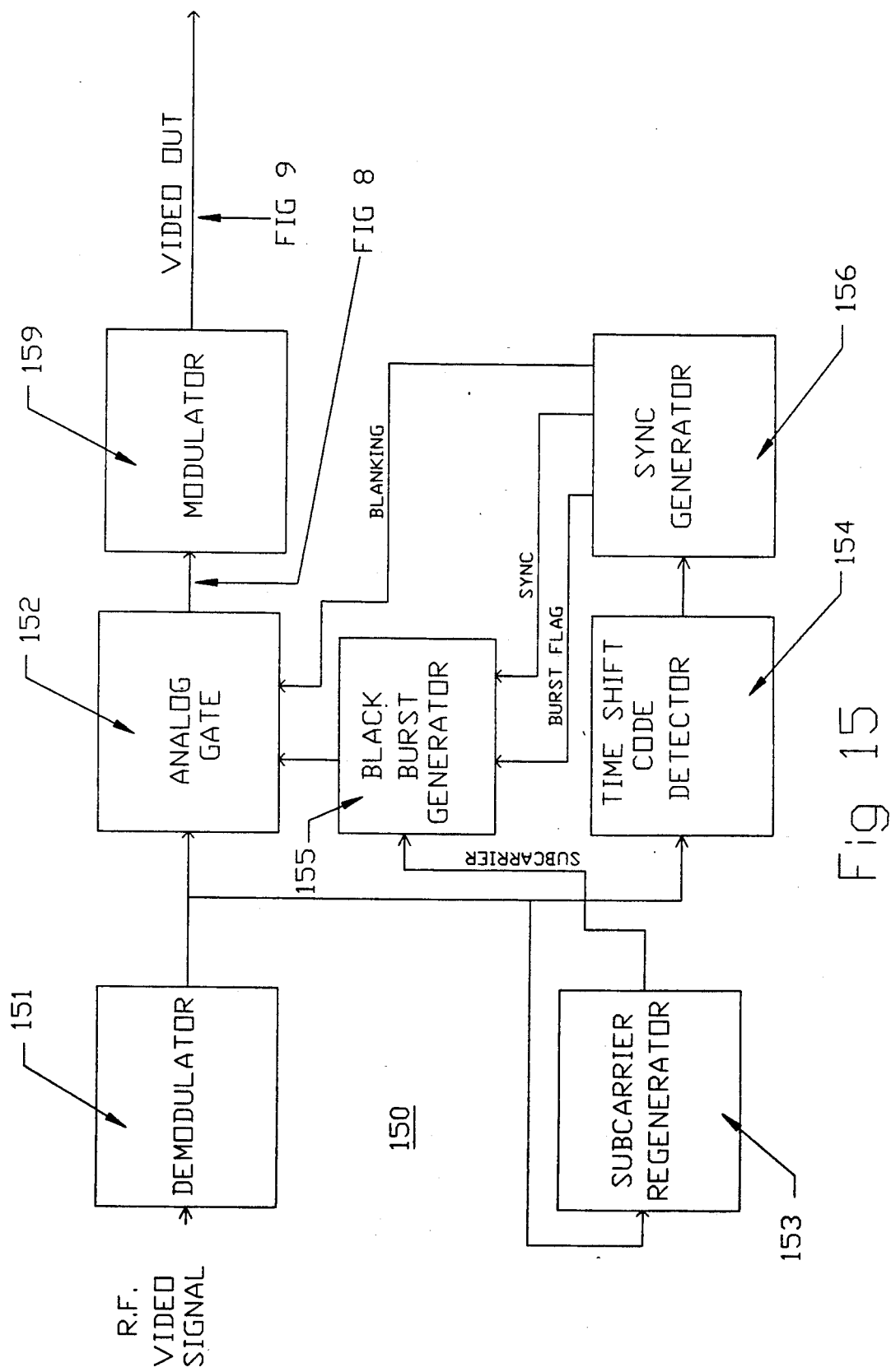

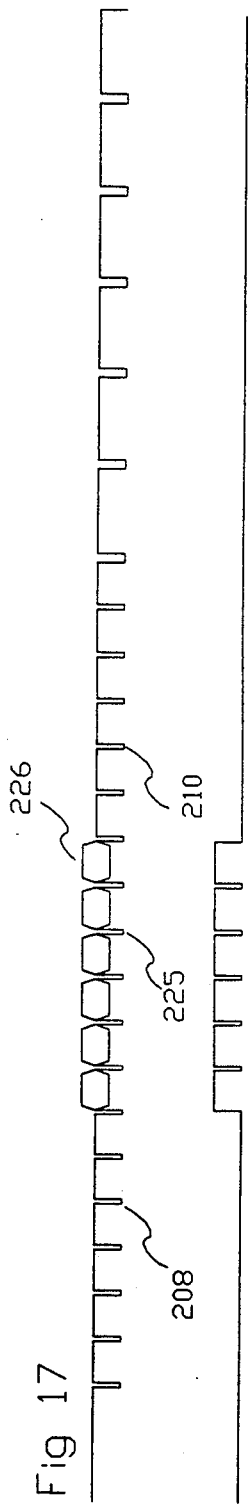
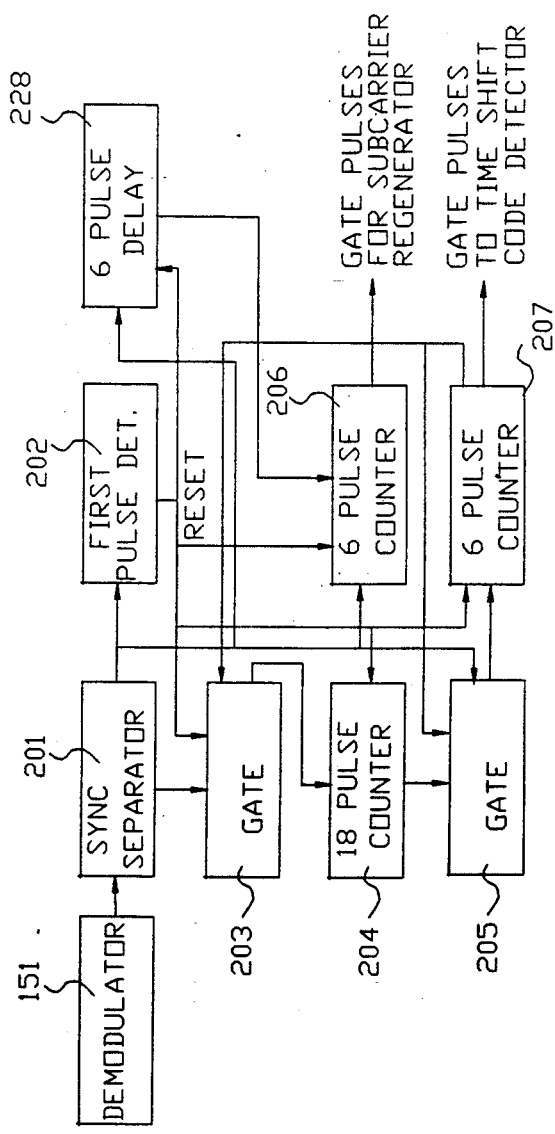
Fig 17
Fig 18
Fig 19
Fig 20

SCRAMBLING VIDEO BY HORIZONTAL AND VERTICAL TIME SHIFTING

BACKGROUND OF THE INVENTION

This invention relates generally to systems for scrambling and unscrambling video images, and more particularly, to a system wherein scrambling is achieved by releasing the image from vertical and horizontal synchronization and shifting the video image in time.

A large number of methods of scrambling and unscrambling video images are currently being employed. Some of the methods are complex and expensive, are difficult to circumvent, and therefore are not easily avoided. It is, of course, desirable that a scrambling method be difficult to overcome, but it is also important that the system not be expensive or complicated, particularly at the receiving end. It is of utmost importance that the scrambling and the descrambling process not degrade image quality.

The need for inexpensive decoding is self-evident, particularly when one considers that, in modern cable televisions systems, at least one such decoder must be provided at each user site. Systems which are currently available generally require an expensive decoder, and therefore fall short of this requirement. There is, therefore, a significant need for a video scrambling and descrambling system which is secure, simple, and inexpensive to implement. In addition to the foregoing, there is a need for a system that scrambles and unscrambles video images, and which can be employed in existing transmission and distribution without requiring extensive or expensive modifications. It would be highly advantageous if the desired system could effect unscrambling of the video image using most, if not all, of the various coding methods which are presently employed.

It is, therefore, an object of this invention to provide a system for scrambling and unscrambling which is simple and inexpensive to implement.

It is another object of this invention to provide a system for scrambling video images which does not degrade the quality of the image after unscrambling.

It is also an object of this invention to provide a video scrambling system which does not require an expensive decoder system at the user's sight.

It is a further object of this invention to provide a scrambling and descrambling system which does not intrude upon the information content of a video signal.

It is additionally an object of this invention to provide a video image scrambling system which is very difficult to circumvent.

It is yet a further object of this invention to provide a video scrambling and descrambling system which can be employed with currently available television receivers.

It is also another object of this invention to provide a video image scrambling and descrambling system which permits viewing of a high quality video image after descrambling, but precludes unauthorized copying of the transmission with the use of conventional video tape recorders.

SUMMARY OF THE INVENTION

The foregoing and other objects are achieved by this invention which provides, in a first method aspect thereof, a method of scrambling a video image prior to transmission of a corresponding video signal, and unscrambling the video image after transmission of the video signal. The video signal is of the type which defines a plurality of sequential vertical periods, each vertical period having associated therewith a vertical period synchronization signal portion, and is provided with a plurality of line information portions arranged sequentially with line synchronization signals interposed in horizontal blanking intervals therebetween. In accordance with the invention, at least a portion of the vertical period synchronization signal is removed from the video signal prior to transmission. The renders unidentifiable a point of beginning of the vertical periods in the video signal. After transmission, a pulse train is generated and incorporated into the video signal for identifying the point of beginning of the video signal vertical periods.

In one embodiment, the step of removing a portion of the vertical period synchronization signal includes the removal of serrated pulses from the video signal. Additionally, a color burst signal is removed prior to transmission, and a camouflage burst is inserted therefor. The generated pulses correspond in time to the camouflage burst.

In a further embodiment of the invention, the line synchronization signals are removed from between predetermined ones of the line information portion for rendering unidentifiable point in time of beginning of the predetermined ones of the line information portion in the video signal. The predetermined ones of the line information portion are shifted in time with respect to the point in time which would have been indicated by the corresponding line synchronization signals, prior to their removal. In this manner, time-shifted line information portions are formed. After the video signal is transmitted, the time-shifted line information portions are resupplied with line synchronization signals which have a time relationship with a respect to their respectively associated time-shifted line information portion which correspond to the removed line synchronization signals. This is performed without shifting the line information portion back to the original time.

In one highly advantageous embodiment of the invention, a synchronization camouflage signal is inserted into each horizontal blanking interval from which a synchronization signal was removed. The synchronization camouflage signal serves to disguise the location in time where the corresponding line synchronization signals were prior to performing the step of removing. In a preferred embodiment, the synchronization camouflage signal corresponds to a mirror image portion of the line information in the immediately prior line information of the video signal. Such camouflage information extends from before the first line and after the last line.

In certain embodiments of the invention, a vertical reset pulse is also shifted in time. The amount of delay or advance may be changed periodically, and the information denoting this change is sent to decoders during some of the unused vertical interval lines of the video signal. The shift in timing of the video information, as indicated hereinabove, is not corrected at the decoders. This results in a significant simplification since the decoders merely add synchronization to match the video timing.

In a practical embodiment of the invention, lines 1 through 15 remain intact, and the horizontal synchronization information is removed from all of the other lines. The other lines are then delayed or advanced by a fixed amount, and the signal is transmitted in that condition. Decoding is achieved in one embodiment by employing a sync generator in the decoder, resetting the counters in the sync generator in such a manner that the timing of its pulses corresponds exactly with the timing of the video information, replacing all of the sync information, including the vertical sync information, from the incoming signal, and replacing it with the locally generated sync. The amount of delay or advance is changed periodically, and information denoting such change is transmitted to the decoder in the video signal on some of the unused vertical lines.

It is a feature of the present invention that the shift in the timing of the video information is not corrected at the decoders. In this respect, the invention relies upon on the characteristic of all television receivers which use sync pulses as the reference point for horizontal retrace. It is a characteristic of such receivers that the absolute timing of the video signal is ignored. Such receivers will depict a correct video image as long as the sync-to-video relationship is correct. Accordingly, it is a significant feature and advantage of the present invention that the timing shift introduced in the video signal at the encoder does not have to be removed by the decoder. This makes the decoder very inexpensive to manufacture, and also helps to maintain a very high quality in the video signal, because the signal does not have to be modified during the video information portion in order to effect the scrambling.

It is an additional feature and advantage of the present invention that even when the picture is shifted rapidly and by large amounts, modern receivers will have no difficulty following same, but conventional video cassette recorders cannot, since they employ electromechanical synchronization systems. The image can therefore be viewed, but not recorded. On the other hand, if the timing shift is made small, the scrambling is not affected, but the unscrambled picture can be recorded. This permits the station operator to operate the scrambler in either mode, i.e., recordable or non-recordable transmission.

In a further embodiment of this method aspect of the invention, the step of time-shifting of the video image is performed in accordance with a predetermined timing law wherein each of the line information portion is delayed by a respectively associated interval of time which is different from the delays associated with other line information portions. In such an embodiment, the time-shifted image would appear to have a nonlinear leading edge which may be a curve. The coding system in this embodiment of the invention is optionally provided with means for selecting from a plurality of available timing arrangements, or laws, each of which defines a predetermined relationship between the durations of the intervals of time. Such a system would require a timing change for each line information portion, and therefore would be somewhat more complicated than shifting by a uniform duration which may be achieved by extending or reducing the interval of a predetermined first line information portion period. The overall duration of the field is maintained constant by adding or substracting time during the period associated with the final line information portion.

In accordance with an apparatus aspect of the invention, there is provided a system for scrambling a video image prior to transmission of a corresponding video signal, and unscrambling the video image after transmission of the video signal. The video signal is of the type having a plurality of predetermined line information portions, as discussed above, arranged sequentially with line synchronization signals inteposed in horizontal blanking intervals therebetween. In accordance with the invention, a system is provided for removing vertical period synchronization data from preselected vertical information portions of the video signal. In addition, line synchronization data is removed from preselected ones of the line information portions of the video signal. The circuitry causes the duration of a predetermined line information portion, to be changed, either by shortening or extending same. Consequently, in a practical embodiment of the invention, subsequent ones of the line information portions are shifted in time, and the overall time difference in the duration of the field is made up on the last line information portion. The vertical period synchronization information is then restored to the video signal.

The present invention contemplates within its scope the application of a scramble law system for varying the duration of sequential ones of the line information portions in accordance with a predetermined scramble law. In this manner, respective portions of the video image are shifted in time by respective amounts. An illustrative scramble law includes circuitry for shifting subsequent ones of the line information portions by a predetermined time requirement whereby the timing of each line is made slightly different. This would raise the cost of decoders, but would provide additional security. The overall effect of such a system would be that the image, instead of being shifted uniformly to the right or to the left, would have a bend in it. A plurality of predetermined laws, or line delay sequences, can be provided, in this embodiment, at the remote location, and the coding data which is transmitted with the video signal identifies the particular sequence to be followed for the following field. Upon receipt of the video signal, the decoder activates the particular law to be applied and then causes the synchronizing circuitry to follow that law.

One simple form of predetermined law, or sequence, provides for shortening each line of the video image, starting from line 17, illustratively by 0.2 microseconds for half of the field, and then lengthening each of the lines for the remaining half of the field by 0.2 microseconds. This will bring a timing back to the original point for following vertical interval. This would result in a somewhat triangular configuration for the leading edge of the scrambled video image.

In another embodiment, the repetition rate of the vertical interval pulses is varied, instead of leaving same at a constant position in time. The value, or magnitude, of the timing change does not have to be scrambled. The decoder will automatically recover the vertical timing information in its conventional sync stiping circuits. However, by controlling the amount of the change from field to field, it is possible to arrive at values which are small enough to permit the electronic circuits of the receiver to follow without degradation, and yet too large for the electromechanical components of video tape recorders to be capable of following.

BRIEF DESCRIPTION OF THE DRAWING

Comprehension of the invention is facilitated by reading the following detailed description, in conjunction with the annexed drawing, in which:

FIG. 1 is a representation of a standard video signal prior to scrambling;

FIG. 2 is a representation of the standard video signal of FIG. 1, after removal of the sync pulse and the color burst;

FIG. 3 a representation of the video signal of FIG. 2, showing the horizontal interval camouflaged with a fill-in signal;

FIG. 4 is a representation of the signal of FIG. 3 showing the addition of a time shift delay, pursuant to a specific illustrative embodiment of the invention;

FIG. 5 is a representation of a modulated signal from a transmitter;

FIG. 6 is a representation of the received video signal after modulation and after gating for removal of the camouflage fill-in signal;

FIG. 7 is a representation of a regenerated sync pulse and color burst reference signal;

FIG. 8 represents the additive combination of the sync pulse and the color burst signals of FIG. 7 to the demodulated signal of FIG. 6;

FIG. 9 is a remodulated version of the regenerated video signal of FIG. 8;

FIG. 11 is a representation of the details of video line 10;

FIG. 12 is a representation of a video signal which contains coded information pertaining to the time-shifting, and further shows the time shifting itself;

FIG. 13 is a representation of the decoded signal showing the regenerated pulse train;

FIGS. 14A and 14B illustrate the timing of a vertical reset pulse;

FIG. 15 is a block and line representation of a decoder which is useful in the implementation of the invention;

FIG. 17 is representation of a vertical pulse train which has been modified to remove the serrated pulses and further modified to include a wide color burst in each of the periods originally occupied by the serrated pulses;

FIG. 18 is a representation of the gate pulses which are used to gate out the wide burst;

FIG. 19 is a block and line representation of a circuit which detects lines which contain the coding information, from the vertical pulse train shown in FIG. 17;

FIG. 20 is a representation of gate pulses which are used to gate out time shift code pulses in the time shift code detector (154) shown in FIG. 15.

DETAILED DESCRIPTION

Figure 10:
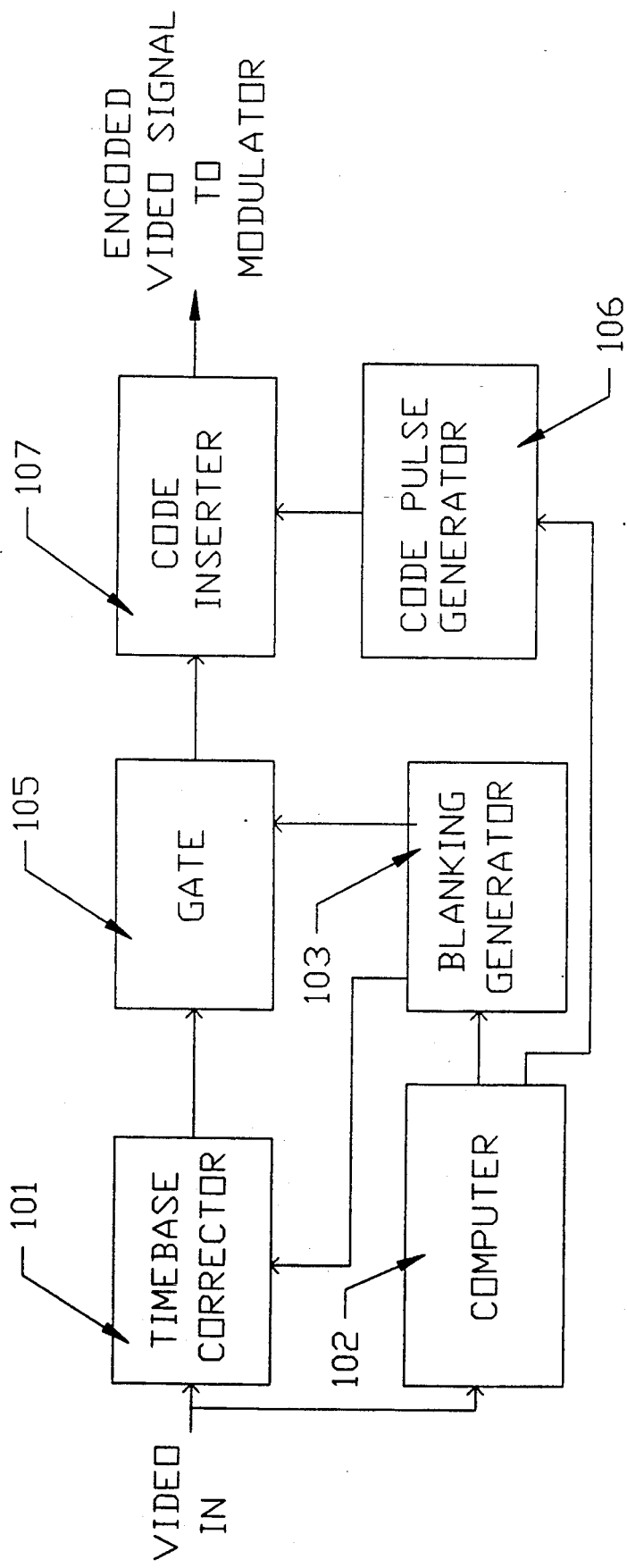
FIG. 10 is a block and line representation of an encoder system which is employed at the video transmitter.

The present invention provides a system of scrambling video wherein the video can be scrambled and unscrambled with relative ease, and yet achieves a very high degree of security. Encoding of the video information is performed at the transmitting end of the system, and decoding is performed using relatively inexpensive decoders at the receiving end.

In a preferred embodiment of the invention, which will be described below with respect to the drawings, video lines 1 through 15, which generally do not contain any video image information since they are transmitted during the vertical interval, remain intact, and the horizontal sync information is removed from all other lines. These other lines are delayed or advanced by a fixed amount, and the signal as modified is transmitted in that condition.

Decoding at the receiving end of the video signal is achieved, as will be described herein, by use of a sync generator in the decoder, resetting the counters in the sync generator in such a manner that the timing pulses correspond exactly with the video information, replacing all of the sync information, including the vertical sync information, from the incoming signal, and replacing it with the locally generated sync. The amount of delay or advance is changed periodically and information denoting such change is sent to the decoders in a scrambled manner on some of the unused vertical interval lines.

FIG. 1 is a standard video signal 10 prior to scrambling. The video signal is formed of a line information portion 11 which contains the video image data associated with one line, a horizontal synchronization pulse 12, and a color burst reference signal 13. These signals are timed within a horizontal blanking interval 15 which is intermediate of consecutive line information portions.

FIG. 2 is the standard video signal, as shown in FIG. 1, after removal of the sync pulse and the color burst reference information. Line information portions 11 have now been stripped of their respectively associated horizontal synchronization pulses and their color burst reference signals. Moreover, the line information portions are shown on a common time scale shared with the video signal of FIG. 1. Systems and circuits for removing horizontal sync information and the color burst reference signal from the video signal are known in the art.

FIG. 3 represents the video signal of FIG. 2, and further shows the horizontal interval camouflaged with a fill-in signal. In order to confuse unauthorized receivers, the horizontal blanking is, at the transmitter (not shown), filled with extraneous information, such as a camouflage signal. In the specific embodiment the camouflage information is in the form of the same information which is present in the line information, but reversed to form a mirror image. Thus, FIG. 3 shows horizontal blanking interval 15 occupied with a signal which is designated as B. Signal B is a mirror image of the video information in section A of line information portion 11.

The particular technique for performing this mirror function is standard in the industry, and persons of skill in the art can modify a commercially available system to perform the function. More specifically, time base corrector conventionally has a counter which addresses a memory system containing the picture information. This counter is conventionally reset at the start of each active line and is enabled to count upwards. The upward direction of the count continues until the end of the line is reached, at which point in a conventional system the count is stopped. In the practice of this specific embodiment of the present invention, the counter, instead of being stopped, is made to reverse its direction and to count downwards from the count at which the direction was reversed. The counter is stopped and reset at the start of the following line information portion, and therefore operates normally for the entire duration of the subsequent line. This technique, the implementation of which is within the competence of persons of ordinary skill in the art, creates a mirror image of the right side of the picture, and will not be described here in further detail, for sake of brevity.

FIG. 4 is a representation of the signal of FIG. 3, additionally showing the addition of a delay. The standard length of a video line is 63.5 microseconds. Scrambling, as will be discussed hereinbelow, is achieved in accordance with the principles of the present invention by shifting the horizontal position of the lines containing the picture information, but leaving them, in this specific illustrative embodiment, all the same length. The lines involved in the shift are lines 17 through lines 262.

The shift is achieved by making line 16 different in length, and by making a corresponding change in length in line 262, which is the last line in the field. By making equal and opposite changes in the two lines mentioned, the timing of the vertical interval pulses remains constant and periodic.

In one illustrative embodiment, line 16 may be one of four possible lengths, 40, 60, 80, or 100 microseconds. This is equivalent to moving the picture sideways, either to the right or the left. If the lengths 40 and 60 are chosen, the picture has the appearance of moving to the left. If 80 or 100 is chosen, the picture appears to move to the right, based on standard sync. The time shifting is different for each field. As will be shown below, the amount and direction of the shift is encoded during lines 10 to 15. Since this invention does not concern itself with the coding mechanism, for the purpose of explanation and illustration, it will be assumed that the picture can be shifted in any one of four positions, and line 15 therefore would contain a number which ranges from 1 to 4.

FIG. 5 represents the modulated signal from a transmitter (not shown). After the horizontal blanking intervals have been filled in with the camouflage signal, the modulated signal from the transmitter, shown in this figure, appears as a continuous signal which does not provide any feature upon which the receiver can synchronize.

FIG. 6 illustrates the received video signal after demodulation and after gating for removal of the camouflage fill-in signal. FIG. 7 is a representation of a regenerated sync pulse and color burst. FIG. 8 illustrates the addition of the sync pulse and the color burst signals of FIG. 7 to the demodulated signal of FIG. 6. FIG. 9 is a remodulated video signal containing the locally regenerated synchronization and color reference information. FIGS. 6-9 illustrate the sequence by which the received signal is modulated and locally regenerated synchronization and color burst data is added there too. FIG. 9 shows the subsequently remodulated signal which in practical embodiment of the invention, can be modulated onto channels 3 or 4.

FIG. 10 is a block and line representation of an encoder system which is employed at the transmitter. This figure shows a time base corrector 101 which, as indicated, may contain a counter (not shown) which counts memory addresses upward from a reset position at the beginning of each line. The time base corrector is responsive to a computer 102 and a blanking generator 103. The output of the time based corrector is conducted through a gate 105 which is controlled by the blanking generator.

Computer 102 generally controls a code pulse generator 106 which is coupled to a code inserter 107. An encoded video signal is provided at the output of code inserter 107, and is conducted to a modulator (not shown) of conventional design. In this manner, the encoded video signal contains the codes which are necessary for demodulation, as will be described hereinbelow, whereby the decoder will employ information contained in the video signal itself to effect the descrambling.

FIG. 11 shows the details of video line 10 of a specific illustrative embodiment of invention. Video line 10 is a portion of the video signal of FIG. 12, which transmits coded information pertaining to the time-shifting, and illustrates in this figure the time shifting itself. Lines 1 through 15 are standard. Lines 10 through 15, however, carry digitally encoded information to indicate to the decoder the exact timing of the sync pulses which are removed from the transmitted signal. The burst is, however, left intact on lines 10 to 15 in this embodiment.

Video line 10 does not contain image information, and occurs in the video signal at a time prior to the picture information. In the specific illustrative embodiment of the invention, lines 10 through 15 as shown in FIG. 12 may contain coding data which will ultimately be used by the decoder (not shown in this figure) for effecting local regeneration of the synchronization information. FIG. 12 further illustrates that at line 16, a predetermined period of time is inserted, as represented by the "difference" between lines 16 and 17. Line 17 is therefore retarded slightly, as are all subsequent lines in this field. An amount of time corresponding to the "difference" between lines 16 and 17 is deducted from line 262, which is shown in FIG. 12 immediately prior to line 1. Thus, the overall period of the field is maintained at the conventional duration.

FIG. 13 is the decoded signal showing the regenerated pulse train, and is shown in the figure on a common time scale with the signals of FIGS. 12, 14A, and 14B. These latter figures illustrate the timing location of a vertical reset pulse. In FIG. 13, the signal generated by the decoder has its coding pulses removed. The original vertical interval sync pulses have been replaced by those generated by the local sync generator. The horizontal sync pulses have been similarly added. The color bursts have also been added locally at the receiving end from the local black burst generator which is discussed hereinbelow with respect to FIG. 15. The video picture information is exactly the same in every way, in the transmitted video signal of FIG. 12 and the regenerated video signal of FIG. 13.

For the purpose of this description, it will be assumed that the decoder looks at line 15 and deciphers the code present there which may be any number from 1 to 4. This number, as previously noted, corresponds in this embodiment to the amount of shift for the particular field. The decoder (not shown in this figure) contains a sync generator (also not shown) with a means for varying absolute time reference of the sync pulses. Soon after line 15, an IDENT pulse is provided by the coding means. The IDENT pulse is shown in FIG. 14A, and is used to reset the horizontal counter in a sync generator chip (not shown in this figure) to a new time reference (one out of a possible 4 positions). This time reference is such that the sync pulse, as well as all of the other pulses generated by the local sync generator, have exactly the correct relationship as the video field being transmitted at that time.

FIG. 15 is a block and line representation of a decoder system 150. The decoder receives the transmitted video signal at a demodulator 151 which is coupled at its output to an analog gate 152. In addition, the output of demodulator 151 is coupled to a subcarrier regenerator 153 and a time-shift code detector 154.

The subcarrier regenerator receives information concerning the color burst reference signal which is transmitted in the video signal prior to the beginning of the video image information in the video signal (see, FIG. 12). The regenerated subcarrier is delivered to a black burst generator 155. The time-shift code detector is coupled at its output to a sync generator 156 which is coupled at burst flag and sync outputs to the black burst generator, and at a blanking output to analog gate 152.

Analog gate 152 produces at its output a signal which corresponds to that described hereinabove with respect to FIG. 8. This signal is conducted to modulator 157 which reduces at its output the modulated signal shown in FIG. 9.

Figure 16:
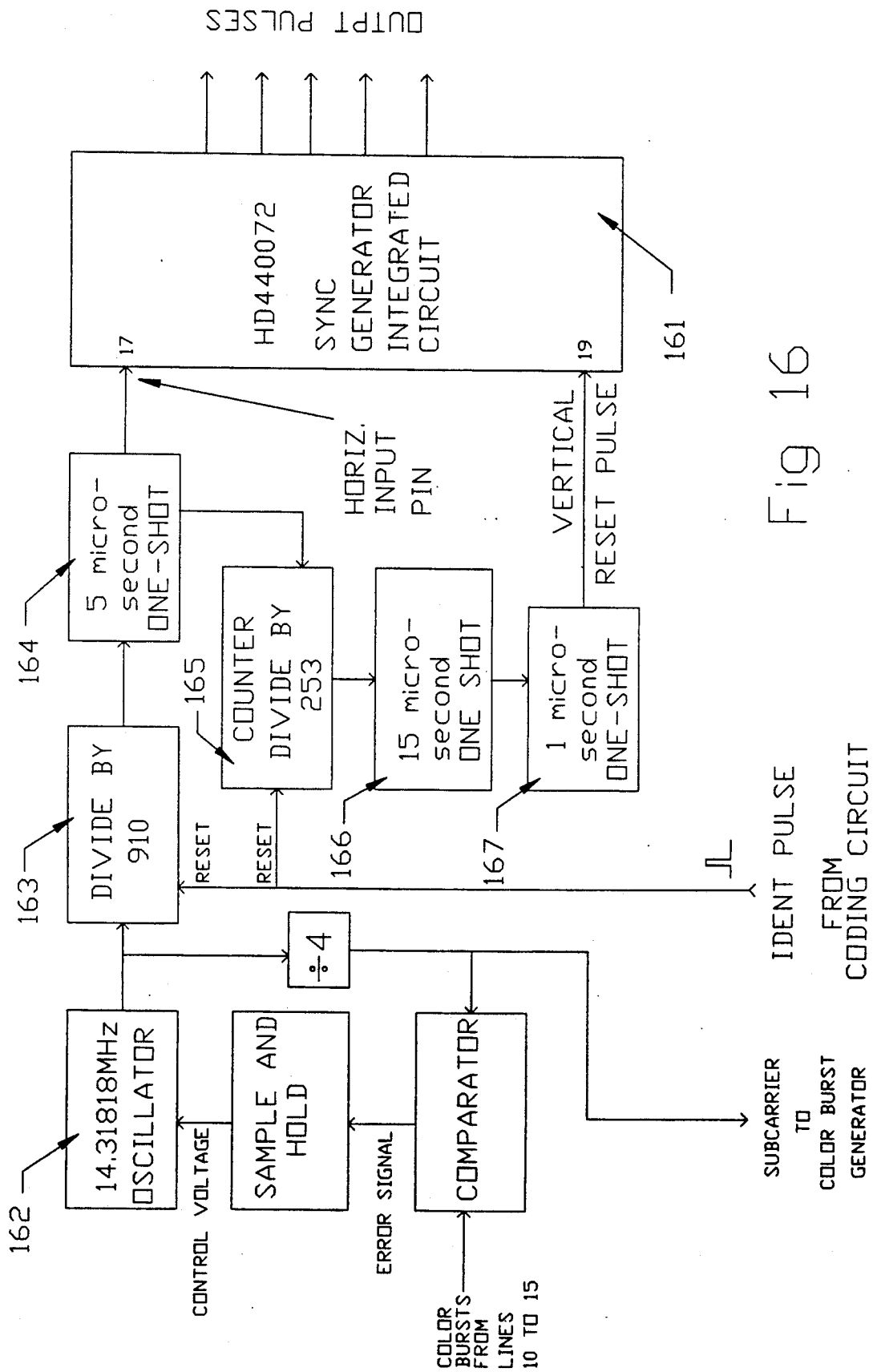
FIG. 16 is a function block and line representation of a system which employs an identification pulse to lock a sync generator chip in the practice of the present invention.

FIG. 16 is a block and line representation of a system which employs an identification pulse to lock a sync generator chip 161. Sync generator chip 161, in this specific embodiment, is the commercially available HD440072 sync generator chip manufactured by Hitachi in Japan. The sync generator chip requires a vertical pulse to reset the counters (not shown) which generate the vertical pulse train. This vertical pulse has to occur on the first serrated pulse. Once these counters are reset, they carry on counting correctly until the power is turned off or reset to another point. This chip also requires a constant train of horizontal pulses (similar to sync) approximately 5 microseconds in width and the exact repetition rate of sync.

FIG. 16 shows one way of achieving this. A 14 MHz oscillator 162 is divided down by a 910 counter 163, which produces pulses at exactly the horizontal line rate of a television signal. This counter is reset by the IDENT pulse to establish the phase of this counter. A 5 microsecond one-shot 164 serves to provide the correct pulse to drive sync generator chip 161. The 5 microsecond one-shot also drives a second counter 165 (a divide by 253). This second counter reaches the end of the count at the start of the following serrated pulse (not shown). The serrated pulse is about 30 microseconds long. The second counter triggers a 15 microseconds one-shot 166. This one-shot times out exactly in the middle of the serrated pulse. The one-shot drives a 1 microsecond one-shot 167 which provides the pulse necessary for the HD440072 chip.

In this decoder, the vertical reset pulse is generated by counting 250 lines from the IDENT pulse, then generating a vertical reset pulse after a delay of 15 microseconds. This puts the vertical reset pulse exactly in the middle of the first serrated pulse.

In an improvement to the system described immediately hereinabove, six serrated pulses 209, shown in FIG. 12, are removed and replaced with six pulses 225 of the same width as the equalizing pulses 208 and 210, as shown in FIG. 17. Additionally, the space between the six new pulses is filled with six wide color bursts 226, as shown in FIG. 17, and the color bursts on lines 10 through 15 are delected. Removing the serrated pulses, improves the quality of scrambling because it prevents standard television receivers from locking in both the horizontal as well as the vertical modes.

FIG. 19, shows, in the form of a block diagram, the circuitry required to identify the vertical interval in the scrambled signal, in spite of the lack of serrated pulses. Base band video from a demodulator 151, is conducted into a sync separator 201, which regenerates the sync pulse train contained in the scrambled signal, a portion of which is shown in FIG. 17. A first pulse detector 202 opens a gate 203, and resets a 6-pulse counter 206, resets a further 6-pulse counter 207, resets an 18-pulse counter 204, and resets a 6-pulse delay 228. 6-pulse counter 206, after a delay by 6-pulse delay 228, receives the sync pulses from sync separator 201 and generates, after a six pulse delay, the six pulses shown in FIG. 18, which are used by subcarrier regenerator 153 (FIG. 15). These pulses correspond in time to the wide subcarrier bursts depicted in FIG. 17, and replace the function of the burst flag pulses used to gate out the color burst in subcarrier regenerators 151.

The 18-pulse counter opens a gate 205 at the end of the eighteenth pulse. Gate 205 permits the sync pulses occurring after the eighteenth equalizing pulse, emanating from sync separator 201, to drive 6-pulse counter 207, which generates the six gate pulses shown in FIG. 20, employing generally known digital techniques. These six gate pulses are used by time shift code detector 154, to gate out and extract the code pulses present in lines 10 through 15, using conventional circuitry. The last of the six pulses from 6-pulse counter 207 resets gate 203.

The conventional subcarrier regenerator 153 (FIG. 15) uses conventional burst flag pulses, (not shown) which are coincident in time with the color bursts, in order to gate out the color bursts present on lines 10 to 15. In the specific illustrative embodiment described herein, the bursts on lines 10 to 15 are absent and are replaced with the six bursts shown in FIG. 17. The gate pulses generated by 6-pulse counter 206 are used to gate out the newly positioned color bursts.

Figure 21:
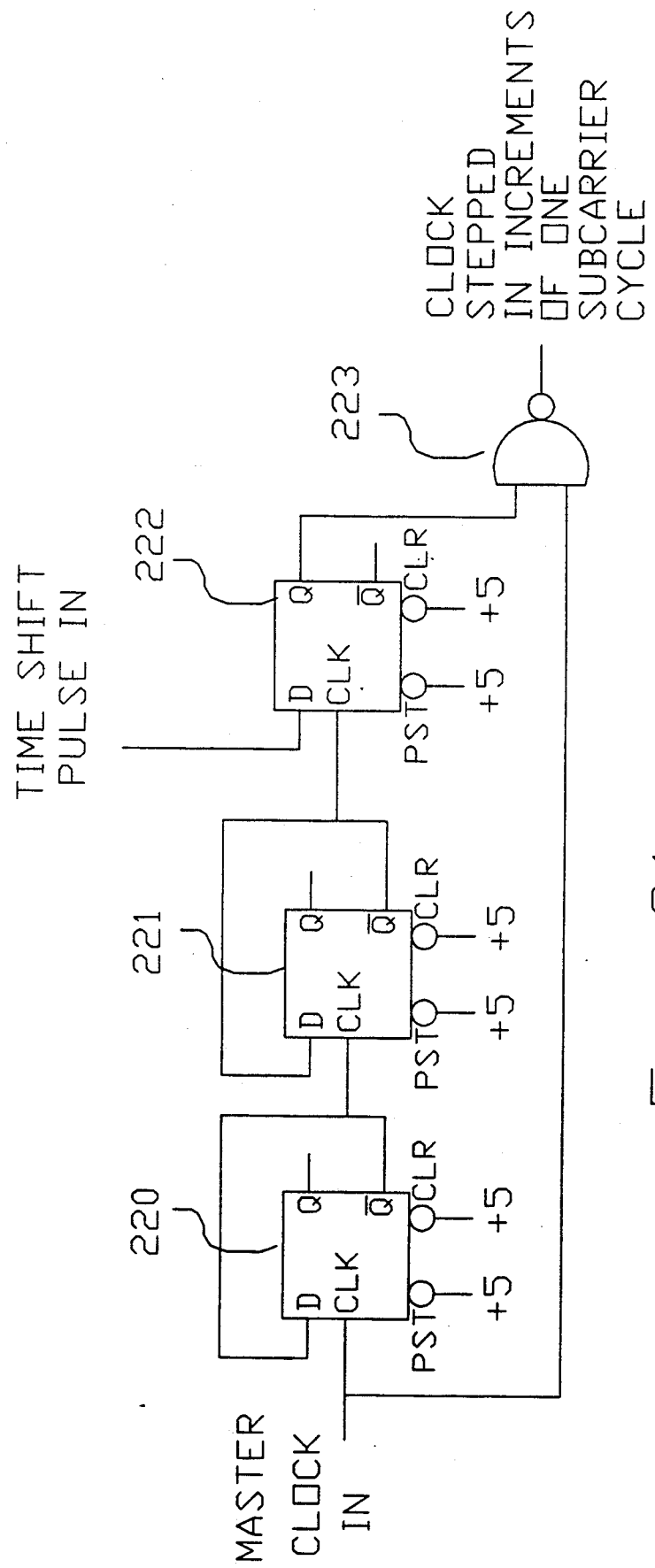
FIG. 21 is a block and line representation of a logic circuit which changes the delay of a signal in increments of one quarter of the input clock frequency.

In accordance with a further aspect of the invention, the shifting in horizontal position is performed in increments of the period of the subcarrier frequency. FIG. 21 is a block and line representation of a specific embodiment of a logic circuit which changes the delay of a signal in increments of one quarter of the input clock frequency. This figure illustrates a system by which time shift for achieving scrambling can be made to occur in increments of the period of one subcarrier cycle. The time shift, as described herein, is generated digitally in time base corrector 101, shown in FIG. 10. The time base corrector is provided with a master clock (not shown) which reads out a signal stored within its memory (not shown). Time shifts in the output of the time base corrector thus inherently occurs in steps which are increments of the period of the master clock frequency. This master clock frequency is conventionally four times the color subcarrier frequency. Time shifts thus conventionally occur in increments of one quarter of the period of the color subcarrier.

In the present illustrative embodiment, the time shifts are made to occur in increments which are substantially equal to the period of one subcarrier cycle. FIG. 21 shows a means of achieving this. Flip flops 220 and 221 jointly divide the master clock frequency by a factor of 4. The signal at the CLK input of flip flop 222 is thus identical to that of the color subcarrier. A time shift pulse signal introduced into the D input of flip flop 222 will appear at its Q output in steps of the period of one subcarrier cycle. This stepped output signal is conducted into one input of a NAND gate 223, the other input being provided with the master clock frequency.

The output of NAND gate 223 consists of clock pulses which shift in increments of one subcarrier cycle, in response to the time shift pulse at the D input of flip flop 222. This clock is used within time base corrector 101 to generate the time shift in the output of time base corrector 101, which is in increments of the period of one subcarrier cycle.

Although the invention has been described in terms of specific embodiments and applications, persons skilled in the art can, in light of this teaching, generate additional embodiments without exceeding the scope or departing from the spirit of the claimed invention. For example, the current description, for the sake of brevity and clarity refers generally to the video lines corresponding to odd fields. However, the description herein includes even fields within its scope. Moreover, the system of the present invention can be used in the context of PAL and SECAM video transmission standards. It is additionally to be understood that persons of ordinary skill in the art can make modifications to the circuit arrangements, in light of the teaching herein, to achieve the objectives of the invention. Accordingly, the drawing and description in this disclosure are proffered to facilitate comprehension of the invention, and should not be construed to limit the scope thereof.

What is claimed is:

1. A method of scrambling a video image prior to transmission of a corresponding video signal and unscrambling the video image after transmission of the video signal, the video signal defining a plurality of sequential vertical periods, each vertical period having associated therewith a vertical period synchronization signal portion having a plurality of pre-equalizing pulses, having a first width a plurality of serrated pulses, having a second width and a plurality of post-equalizing pulses, having a first width and being provided with a predetermined number of sequential horizontal line information portions arranged sequentially with line synchronization signals interposed in horizontal blanking intervals therebetween, whereby the line information portions and the line synchronization signals combine sequentially during each vertical period to form the video image, the method comprising the steps of:

removing prior to transmission of the video signal said plurality of the serrated pulses of the vertical period synchronization signal portions from between predetermined ones of the line information portions of the video signal for rendering unidentifiable a point of beginning in the video signal of said predetermined ones of the vertical periods in the video signal; replacing said plurality of serrated pulses with a corresponding plurality of pulses having said first width; and regenerating after transmission of the video signal a pulse train which is incorporated into said video signal and which identifies said point of beginning in the video signal of said predetermined ones of the vertical periods.

2. The method of claim 1 wherein there is provided the further step of removing a color burst having a predetermined width signal prior to transmission and inserting therefor a camouflage color burst having a wider width than said predetermined width.

3. The method of claim 2 wherein said step of regenerating comprises the step of generating pulses corresponding in time to said camouflage color burst.

4. The method of claim 1 wherein there is further provided the steps of:

removing the line synchronization signals from between predetermined ones of the line information portions of the video signal for rendering unidentifiable a point in time of beginning of said predetermined ones of the line information portions in the video signal;

time shifting said predetermined ones of said line information portions by a predetermined period of time with respect to the location in time where the corresponding line synchronization signals were prior to performing said step of removing, for forming time-shifted line information portions; and supplying to said time-shifted line information portions restoration line synchronization signals, said restoration line synchronization signals having a time relationship with respect to their respectively associated time-shifted line information portions corresponding to said removed line synchronization signals.

5. The method of claim 4 wherein there is provided the further step of vertical timing shifting a vertical timing signal in the video signal.

6. The method of claim 4 wherein there is provided the further step of code transmitting in the video signal descrambling code data responsive to said period of time in said step of time shifting, said step of supplying being responsive to said descrambling code data.

7. The method of claim 6 wherein said step of code transmitting is performed during a vertical blanking interval.

8. The method of claim 6 wherein said step of code transmitting is performed during a horizontal blanking interval.

9. The method of claim 4 wherein said step of time shifting comprises the further step of scramble time shifting each of the line information portions, whereby each such line information portion is delayed by a respectively associated interval of time, each of said intervals of time being related to each other in accordance with a predetermined scramble scheme.

10. The method of claim 9 wherein there is provided the further step of scramble scheme transmitting with the video signal scrambling information which defines a relationship between the durations of said intervals of time.

11. The method of claim 10 wherein said scrambling information corresponds to nonuniform durations of said intervals of time.

12. The method of claim 4 wherein said step of time shifting comprises the step of varying the duration of a preselected one of the line information portions by a predetermined period of variation, whereby subsequent ones of the line information portions are similarly shifted in time.

13. The method of claim 12 wherein there is provided the further step of varying the duration of a preselected other line information portion by a period of time equal to said predetermined period of extension, whereby the overall duration of all of the line information portions which form the video image remains the same.

14. A method of scrambling a video image prior to transmission of a corresponding video signal and unscrambling the video image after transmission of the video signal, the video signal having a vertical reset portion, said vertical reset portion having a plurality of pre-equalizing pulses having a first width, a plurality of serrated pulses having a second width, a plurality of post-equalizing pulses having a first width associated therewith, and being followed by a plurality of line information portions arranged sequentially with line synchronization signals interposed in horizontal blanking intervals therebetween, whereby the line information portions and the line synchronization signals combine to form the video image, the method comprising the steps of:

removing the line synchronization signals from between predetermined ones of the line information portions of the video signal for rendering identifiable a point in time of beginning of said predetermined ones of the line information portions in the video signal;

removing color reference signals from between said predetermined ones of the line information portions of the video signal;

removing vertical period information exclusively in the form of removing said plurality of serrated pulses from vertical reset portion from the video signal; replacing said plurality of serrated pulses with a corresponding plurality of pluses having said first width, time shifting said predetermined ones of said line information portions by a predetermined period of time with respect to the location in time where the corresponding line synchronization signals were prior to performing said step of removing, for forming time-shifted line information portions;

providing in the video signal during the vertical reset portion thereof, time-shift data corresponding to the performance of said step of time shifting;

reading said time-shift data after transmission of the video signal;

supplying to said time-shifted line information portions restoration line synchronization signals, said restoration line synchronization signals being responsive to said time-shift data and having a time relationship with respect to their respectively associated time-shifted line information portions corresponding to said removed line synchronization signals;

first restoring color reference signals between said predetermined ones of the line information portions of the video signal, said step of first restoring being responsive to color reference signals associated with line information portions which are prior in time to said predetermined ones of said line information portions; and second restoring vertical period information.

* * * * *